United States Patent [19]

Koyata et al.

[11] Patent Number: 5,362,323
[45] Date of Patent: Nov. 8, 1994

[54] CEMENT ADMIXTURE COMPOSITION

[75] Inventors: Hideo Koyata, Kanagawa; Susumu Honda, Tokyo, both of Japan

[73] Assignees: W. R. Grace & Co. Conn., New York, N.Y.; NOF Corporation, Tokyo, Japan

[21] Appl. No.: 15,710

[22] Filed: Feb. 9, 1993

[30] Foreign Application Priority Data

Feb. 14, 1992 [JP] Japan .................. 4-028143
Feb. 14, 1992 [JP] Japan .................. 4-028144
Feb. 14, 1992 [JP] Japan .................. 4-028145

[51] Int. Cl.$^5$ .............. C04B 24/02; C04B 24/04
[52] U.S. Cl. ................. 106/810; 106/709; 106/714; 106/724; 106/728; 106/802; 106/823; 524/5; 524/558; 526/271; 526/318; 526/332
[58] Field of Search ......... 106/708, 709, 714, 724, 106/802, 823, 728, 810; 524/5, 558; 526/271, 318, 332

[56] References Cited

U.S. PATENT DOCUMENTS

| | | | |
|---|---|---|---|
| 2,965,678 | 12/1960 | Sunberg et al. | 106/823 |
| 4,471,100 | 9/1984 | Tsubakimoto et al. | 525/367 |
| 4,547,223 | 10/1985 | Goto et al. | 106/724 |
| 4,589,995 | 5/1986 | Fukumoto et al. | 252/180 |
| 4,946,904 | 8/1989 | Akimoto et al. | 525/327.8 |
| 5,142,036 | 8/1992 | Akimoto et al. | 106/823 |
| 5,162,402 | 11/1992 | Ogawa et al. | 524/5 |
| 5,223,036 | 6/1993 | Koyata et al. | 106/724 |

FOREIGN PATENT DOCUMENTS

| | | | |
|---|---|---|---|
| 2050084 | 4/1972 | Germany | 106/802 |
| 56-037259 | 4/1981 | Japan | 106/802 |
| 58-38380 | 8/1983 | Japan . | |
| 58-38381 | 8/1983 | Japan . | |
| 59-176312 | 5/1984 | Japan . | |
| 59-098968 | 6/1984 | Japan | 106/802 |
| 59-128240 | 7/1984 | Japan | 106/802 |
| 59-131552 | 7/1984 | Japan | 106/802 |
| 59-137355 | 8/1984 | Japan | 106/802 |
| 59-137383 | 8/1984 | Japan | 106/802 |
| 59-164662 | 9/1984 | Japan | 106/802 |
| 62-025163 | 6/1987 | Japan . | |
| 63-285140 | 11/1988 | Japan . | |
| 64000108 | 1/1989 | Japan . | |
| 1297411 | 11/1989 | Japan . | |
| 2138317 | 5/1990 | Japan . | |
| 2138318 | 5/1990 | Japan . | |
| 2163108 | 6/1990 | Japan . | |
| 3237049 | 3/1991 | Japan . | |
| 4175253 | 6/1992 | Japan . | |
| 4175254 | 6/1992 | Japan . | |
| 82003071 | 9/1982 | WIPO | 106/802 |

*Primary Examiner*—Anthony Green
*Attorney, Agent, or Firm*—Howard J. Troffkin

[57] ABSTRACT

Cement admixture compositions formed from alkenyl ether/maleic anhydride copolymers having specific molecular structures have been found to impart a high degree of slump loss over a sustained period of time while not causing any significant set retardation of the treated cement based composition.

14 Claims, No Drawings

CEMENT ADMIXTURE COMPOSITION

BACKGROUND OF THE INVENTION

The present invention relates to a cement admixture composition. More particularly, it relates to an admixture composition for hydraulic cement compositions such as mortar and concrete to dramatically improve their workability by preventing decrease in their flowability over sustained periods of time (herein called as "slump loss").

Slump loss is a major problem in the concrete industry. It is highly desired to have a cement additive which will impart high degree of flowability over an extended period of time while not imparting any significant set retardation to the cement composition. Various proposals have been made to solve this problem but, such proposals have not provided a combination of the desired characteristics or only provide the desired characteristics in low degrees.

It is generally known, for example, that the copolymers of alkenyl ethers and maleic anhydride and the derivatives thereof can be employed as cement additives to improve slump loss [Japanese Patent Publication (Kokai) Nos. 285140/1988 and 163108/1990]. However, copolymers of this class which have been previously used, exhibit only small improvement in slump loss or caused excessive set retardation to the treated cement composition.

It has now been found that certain copolymer compositions described below having a specified molecular structure have remarkable effectiveness for the prevention of slump loss without causing significant set retardation.

SUMMARY OF THE INVENTION

The present invention is directed to a cement admixture composition which requires the use of certain alkenyl ether/maleic anyhydride copolymers. More specifically, the present admixture composition is composed of (i) an alkenyl ether/maleic anhydride copolymer having oxyalkylene chains with from 60 to 95 oxyalkylene units ("Copolymer A"), as more fully described herein below; or (ii) an alkenyl ether/maleic anydride copolymer having oxyalkylene chains with from 1 to 40 oxyalkylene units ("Copolymer B") in combination with an alkenyl ether/maleic anhydride copolymer having oxyalkylene chains with from 100 to 150 oxyalkylene units ("Copolymer C"), each as more fully described hereinbelow; or (iii) an alkenyl ether/maleic anhdride Copolymer C in combination with a polycarboxylic acid type polymer, each of which is more fully described hereinbelow.

The specific cement admixture compositions of this invention have been unexpectedly found to impart a high degree of slump loss over a sustained period of time while not imparting any significant set retardation.

DETAILED DESCRIPTION

The present invention is directed to a cement admixture which has been unexpectedly found to provide a high flowability to cement compositions such as concrete and cement mortar, provide the high flowability over an extended period of time without imparting a significant delay in the curing (set) of the cement composition. This combination of properties has been unexpectedly achieved with the presently described cement admixture compositions to provide the construction industry.

The cement additive compositions required by the present invention comprise a copolymer of an alkenyl ether and maleic anhydride. Three (3) specific copolymers, when used in the manner described hereinbelow, have been found to achieve the desired combination of properties. Each copolymer, respectively, has an alkenyl ether comonomer represented by the formula:

$$R^1O(AO)_nR^2 \quad \text{(I),}$$

$$R^1O(AO)_mR^2 \quad \text{(II),}$$

or $$R^1O(AO)_pR^2 \quad \text{(III)}$$

wherein in each of the above formulae $R^1$ represents a $C_{2-5}$ alkenyl group;

$R_2$ represents a $C_{1-4}$ alkyl group;

AO represents a $C_{2-18}$ oxyalkylene group in which O represents an oxygen atom and A represents an alkylene group;

n represents an average adduct mole number of from 60 to 95 for the oxyalkylene group oxyalkylene group having a number of from 60 to 95;

m represents an average adduct mole number of from 1 to 40 for the oxyalkylene group;

p represents an average adduct mole number of from 100 to 150 for the oxyalkylene group In the present description and in the appended claims, the term "Copolymer A" shall mean a copolymer of alkenyl ether I and maleic anhydride, as the anhydride, or a partially or completely hydrolyzed product or as a salt (alkali or alkaline earth metal) of the hydrolyzed product and the molar ratio of alkenyl ether I to maleic anydride being from 30:70 to 70:30;

"Copolymer B" shall mean a copolymer of alkenyl ether II and maleic anhydride, as the anhydride, or a partially or completely hydrolyzed product or as a salt (alkali or alkaline earth metal) of the hydrolyzed product and the molar ratio of alkenyl ether II to maleic anydride being from 30:70 to 70:30; and "Copolymer C" shall mean a copolymer of alkenyl ether III and maleic anhydride, as the anhydride, or a partially or completely hydrolyzed product or as a salt (alkali or alkaline earth metal) of the hydrolyzed product and the molar ratio of alkenyl ether III to maleic anhydride being from 30:70 to 70:30.

$C_{2-5}$ alkenyl groups represented by $R^1$ in each of the above described formulae (I), II, and III, include for example, vinyl, allyl, methallyl, 1,1-dimethyl-2-propenyl and 3-methyl-3-butenyl groups and of these groups, allyl group is preferably employed.

$C_{2-18}$ oxyalkylene groups represented by AO in the above described formulae (I), (II) and (III) include, for example, oxyethylene, oxypropylene, oxybutylene, oxytetramethylene, oxydodecylene, oxytetradecylene, oxyhexadecylene and oxyoctadecylene groups. Of these oxyalkylene groups, $C_{2-4}$ oxyalkylene groups such as oxyethylene, oxypropylene and oxybutylene are preferred. The AO may include two or more types of oxyalkylene moieties and such oxyalkylene moieties may be linked in block or at random.

$C_{1-4}$ alkyl groups represented by $R^2$ in the above described formulae I, II and III include, for example, methyl, ethyl, propyl, isopropyl, n-butyl, isobutyl and tertiary butyl groups. When the carbon atoms is more than 4 in the $R^2$, the amount of air entrained in the mortar or concrete admixture is increased, and accordingly, it is preferred to select a $C_{1-4}$ alkyl group when air entrainment is not desired.

Thus, in one embodiment of the present invention, the cement admixture is composed of Copolymer A where the average adduct mole number of the oxyalkylene group represented by n is 60 to 95. This cement admixture exhibits the properties of affecting the initial short term dispersion of the particles comprising the cement composition similarly to that caused by conventional slump loss admixtures, such as naphthalene sulfonate formaldehyde high range condensate types, sulfonated melamine resin type or lignosulfonate type admixtures. The present Copolymer A further unexpectedly increases slump with the progression of time. Thus, the present admixture composed of Copolymer A provides both initial and progressive increases in slump to hydraulic cement compositions.

This cement additive has high dispersability and ability to prevent slump loss and, in addition, low setting retardation. Thus, when the cement additive is used alone, the desired high effects can be obtained.

Furthermore, depending on the types of hydraulic cement and aggregate and the compositions formed therewith, the cement admixture of Copolymer A may also contain small amounts (5 to 30 parts by weight, based on 100 parts by weight of Copolymer A, its hydrolyzed product or a salt of the hydrolyzed product of the present invention), of Copolymer B or Copolymer C, their hydrolyzed product or a salt of the hydrolyzed product. The desire to incorporate Copolymer B or Copolymer C can be readily determined by conducting slump tests of the cement composition to achieve the specific characteristic desired.

It is believed, although not meant to be a limitation on the present invention, that Copolymer A of the present invention more effectively increases the dispersibility of the cement composition particles than observed when using conventional cement slump enhancing additives. The subject Copolymer A may form a hydrate layer around the polyoxyalkylene group extending from the main chain of the copolymer which is absorbed on the surface of cement particles, and this layer must provide steric hindrance which maintains the dispersibility of the cement particles for an extended period of time. Thus, excellent dispersibility of cement particles, and extended prevention of slump loss can be exhibited. At the same time, Copolymer A does not substantially effect the initial set time of a cement composition.

In a second embodiment of the present invention, the above described Copolymer B is employed together with the Copolymer C at a mixing weight ratio of from 95 to 5 parts Copolymer B to 5 to 95 parts Copolymer C to form a 100 part mixture. This ratio is preferably from 80:20 to 20:80. This combination can render slump loss zero. When the mixing weight ratio is outside the above described range, sufficient retention of slump cannot be obtained and there is a possibility of causing the segregation of the particles of the cement composition due to extremely high increase in fluidity with the progression of time.

The average adduct mole number p of Copolymer C can be a number of 100 or more and is not limited. However, from the standpoint of ease of preparing such Copolymer C, the average adduct mole number p is preferably between 100 to 150.

It is also believed, although not meant to be limitation on the present invention, that the cement additive comprising a mixture of Copolymer B and Copolymer C of the present invention shows the outstanding slump retention due to the interaction of these copolymers with the cement particles. The ability to greatly increase the dispersibility of the cement particles at the initial stage may be provided mainly by Copolymer B while the extended action of Copolymer C provides the present unique cement admixture composition. Further, a hydrate layer may be formed around the polyoxyalkylene group extending from the main chain predominantly of Copolymer C which is absorbed on the surface of cement particles, and this layer accompanies steric hindrance which maintains the dispersibility of the cement particles for a long period of time. Thus, excellent dispersibility of cement particles and prevention of slump loss can be exhibited. Again, set retardation is not exhibited by cement compositions having this admixture.

In a third embodiment of the present invention, a cement admixture is composed of the above described Copolymer C together with a polycarboxylic acid type of polymer ("Polymer D") at a mixing weight ratio of Copolymer C to Polymer D of from 5~95:95~5, preferably of from 10–90:90–10. This combination renders slump loss of zero. When the mixing weight ratio is outside the above described range, high degree of slump retention cannot be obtained and there is a possibility of causing segregation of the particulate of the cement composition due to high degree of remarkable increase in fluidity with the progression of time.

Polymer D found useful when employed together with Copolymer C can be any water soluble polymer having carboxyl group and is not particularly limited. The Polymer D found useful in conjunction with Copolymer C for an admixture of the present invention include synthetic high molecular weight copolymers having a carboxyl groups, such as, for example, copolymers of acrylic acid, methacrylic acid, maleic acid or maleic anhydride with a $C_4$ or $C_5$ fraction produced in petroleum refining, or styrene or acrylamide.

If other types of cement additives, such as naphthalene sulfonate formaldehyde high range condensate type are used with Copolymer C, one must use excessive amounts of the resultant cement additive to obtain the desired slump. In contrast, the cement admixture of Copolymer C and Polymer D provides the desired combination of effects at low dosages.

Copolymers A, B and C of the present invention can be prepared by the polymerization of an alkenyl ether of formula (I), (II) or (III) and maleic anhydride in the presence of a peroxide catalyst in accordance with the method described in Japanese Patent Application (Kokai) No. 297411/1989. The mole ratio of the alkenyl ether of formula (I), (II) or (III) to the maleic anhydride is typically 30~70:70~30 and preferably 50:50. If desired, the subject copolymers may contain another monomer which is copolymerizable therewith such as styrene, an alpha-olefin or vinyl acetate in amounts of up to 30 percent by weight of the total weight of the monomers.

The hydrolyzed product of the copolymer is a product having a hydrolyzed maleic acid unit resulting from the hydrolysis of the maleic anhydride unit in the copolymer.

The salt of the hydrolyzed product of the copolymer A is a salt formed by the maleic acid unit. Exemplary salts include alkali metal salts and alkaline earth metal salts such as lithium salts, sodium salts; ammonium salts; and organic amine salts.

The amount of the cement additive which may be employed to provide the desired effects of the present invention is typically 0.05 to 2 parts by weight preferably 0.1 to 0.5 part by weight based on 100 parts by weight of cement of the cement composition being treated. When the amount is less than 0.05 parts by weight, the desired effects cannot be expected and amounts of more than 2 parts by weight may unfavorably cause the separation of the components or set retardation of the cement composition.

Conventional cement additives, such as air entrainers, water proofing agents, strength enhancers, antifoaming agents and curing accelerators can be used with the subject cement additive. These additives can be mixed with the cement composition prior to, along with or subsequent to the addition of the present cement additive.

The cement additive of the present invention can be used for various types of cement such as normal portland cement, high early strength portland cement, ultra high early strength portland cement, portland blast-furnace slag cement, moderate heat portland cement, fly ash cement and sulfate resisting cement and other hydraulic materials other than cement, such as gypsum.

The cement additive of the present invention, for example, can be added to the mixing water for the preparation of a cement composition and then mixed with the cement composition, or it may be added to an already mixed cement composition. Alternately, the cement additive can be supplied as an aqueous solution or suspension. When in solution or suspension form, the cement composition may be up to 50% by weight.

The cement additive of the present invention imparts high flowability to cement compositions such as mortar and concrete without causing any remarkable setting retardation and, in addition, it has an excellent ability to prevent slump loss over extended periods. Accordingly, the cement additive of the present invention can bring about a significant improvement on workability in construction works. Thus, the cement additive of the present invention can have various applications. For example, it can be effectively used as a fluidizing agent or a high range water reducing agent or concrete such as ready mixed concrete or as a high range water reducing agent for the production of concrete secondary products.

The present invention is further explained by the following examples which are given for illustrative purposes and are not meant to limit the invention. All parts and percentages are by weight unless otherwise stated.

EXAMPLES 1 TO 14 AND COMPARATIVE EXAMPLES 1 TO 14

Forty liters of the concrete composition as shown in Table 1 and the cement additive as shown in Tables 3 and 4 were added in a 50 liter forced mixing type mixer and mixed for 90 seconds to prepare fluidizied concrete having a slump of 18 cm and an air content of 4 to 5% by volume by using a commercial air entrainer ("AE-140D", a product of Denka-Grace K.K.) in order to attain the desired air content. After mixing, the mixture was transferred into a mixing boat and retempering was conducted at a predetermined number of times every 30 minutes and the change in slump and air content with the progression of time was measured for up to 60 minutes.

The procedures specified in JIS-A6204 were employed to measure slump, air content, setting time and compressive strength and to prepare test specimens for measuring the compressive strength. The test results are shown in Table 5 for Examples 1 to 14 and in Table 6 for Comparative Examples 1 to 14.

TABLE 1

| Concrete Composition | | | | | |
|---|---|---|---|---|---|
| Unit Weight (Kg/m$^3$) | | | | Ratio of Water to | Ratio of Fine Aggregate to Fine Aggregate and |
| Cement[1] | Water[2] | Fine Aggregate[3] | Coarse Aggregate[4] | Cement (weight %) | Coarse Aggregate (volume %) |
| 320 | 160 | 892 | 948 | 51.9 | 49.5 |

Water reducing rate from plain concrete: 18%
[1] Cement: Commercial portland cement (an equi-amount mixture of 3 types of commercial portland cement); Specific gravity: 3.16
[2] Water: Tap Water
[3] Fine aggregate: Sand from the Ohi River in Japan; Specific gravity: 2.60 Fineness modulus: 2.76
[4] Coarse aggregate: Crushed stone produced at Oume in Tokyo; Specific gravity: 2.64, Fineness modulus: 6.60

TABLE 2

| Co-polymer | Alkenyl Ethers of Formulae (I) (II) & (III) | Number Average Molecular Weight |
|---|---|---|
| (a) | $CH_2=CHCH_2O(C_2H_4O)_{11}CH_3$ | 20,000 |
| (b) | $CH_2=CHCH_2O(C_2H_4O)_{33}CH_3$ | 20,000 |
| (c) | $CH_2=CHCH_2O(C_3H_6O)_{15}(C_2H_4O)_{15}C_4H_9$*[1] | 35,000 |
| (d) | $CH_2=CHCH_2O(C_3H_6O)_6(C_2H_4O)_{12}CH_3$*[2] | 30,000 |
| (e) | $CH_2=CHCH_2O(C_2H_4O)_{66}CH_3$ | 30,000 |
| (f) | $CH_2=CHCH_2O(C_2H_4O)_{91}CH_3$ | 40,000 |
| (g) | $CH_2=CHCH_2O(C_2H_4O)_{115}CH_3$ | 45,000 |

*[1] $(C_3H_6O)(C_2H_4O)$: 15:15 random adduct
*[2] $(C_3H_6O)(C_2H_4O)$: 6:12 block adduct

1. Preparation of Copolymer (a)

The ingredients as set forth below were charged into a four-necked flask equipped with a condenser, a nitrogen gas inlet tube, a thermometer and a stirrer and then the temperature was raised to a temperature of from 80° C. to 90° C. in a nitrogen atmosphere and stirring was continued for 7 hours in the nitrogen atmosphere at the temperature to carry out the copolymerization reaction.

| | |
|---|---|
| $CH_2=CHCH_2O(C_2H_4O)_{11}CH_3$ as alkenyl ether (II) | 1668.0 g |
| Maleic anhydride | 308.7 g |
| Tert-butylperoxy-2-ethyl hexanoate | 16.2 g |
| Toluene | 556.0 g |

After completion of the reaction, the toluene was distilled off from the reaction solution at 110° C. under a reduced pressure of about 10 mm Hg to give a copolymer as a brown viscous liquid.

2. Preparation of Copolymer (b)

The procedures of Preparation of Copolymer (a) were repeated except that the following ingredients were employed.

| | |
|---|---:|
| $CH_2=CHCH_2O(C_2H_4O)_{33}CH_3$ as alkenyl ether (II) | 1524.0 g |
| Maleic anhydride | 102.9 g |
| Benzoyl peroxide | 9.1 g |
| Toluene | 508.0 g |

As a result, a copolymer was obtained as a brown solid at normal temperature.

3. Preparation of Copolymer (c)

The procedures of Preparation of Copolymer (a) were repeated except that the following ingredients were employed.

| | |
|---|---:|
| $CH_2=CHCH_2O(C_3H_6O)_{15}(C_2H_4O)_{15}C_4H_{19}$ as alkenyl ether (II) (random adduct) | 1644.0 g |
| Maleic anhydride | 102.9 g |
| Benzoyl peroxide | 8.6 g |
| Toluene | 556.0 g |

As a result, a copolymer was obtained as a yellow viscous liquid.

4. Preparation of Copolymer (d)

The procedures of Preparation of Copolymer (a) were repeated except that the temperature of from 75° C. to 85° C. was employed and the following ingredients were employed.

| | |
|---|---:|
| $CH_2=CHCH_2O(C_3H_6O)_{16}(C_2H_4O)_{12}CH_3$ as alkenyl ether (II) as block adduct | 1864.0 g |
| Maleic anhydride | 205.8 g |
| Asobisisobutyronitrile | 13.0 g |
| Toluene | 621.0 g |

As a result, a copolymer was obtained as a yellow viscous liquid.

5. Preparation of Copolymer (e)

The ingredients as set forth below were charged in a four-neck flask equipped with a condenser, a nitrogen gas inlet tube, a thermometer and a stirrer and then the temperature was raised to a temperature of from 90° C. to 100° C. in a nitrogen atmosphere and stirring was continued for 3 hours in the nitrogen atmosphere at the temperature to carry out the copolymerization reaction.

| | |
|---|---:|
| $CH_2=CHCH_2O(C_2H_4O)_{66}CH_3$ as alkenyl ether (I) | 1785.6 g |
| Maleic anhydride | 61.7 g |
| Tert-butylperoxy-2-ethyl hexanoate | 13.0 g |
| Toluene | 297.6 g |

After completion of the reaction, the toluene was distilled off at 110° C. under a reduced pressure of about 10 mmHg to give a copolymer as a brown solid at normal temperature.

6. Preparation of Copolymer (f)

The procedures of Preparation of Copolymer (e) were repeated except that the following ingredients were employed.

| | |
|---|---:|
| $CH_2=CHCH_2O(C_2H_4O)_{91}CH_3$ as alkenyl ether (I) | 800.0 g |
| Maleic anhydride | 20.2 g |
| Tert-butylperoxy-2-ethyl ethanoate | 4.7 g |
| Toluene | 133.3 g |

As a result, a copolymer was obtained as a brown solid.

7. Preparation of Copolymer (g)

The procedures of Preparation of Copolymer (e) were repeated except that the following ingredients were employed.

| | |
|---|---:|
| $CH_2=CHCH_2O(C_2H_4O)_{115}CH_3$ as alkenyl ether (III) | 2566.0 g |
| Maleic anhydride | 51.5 g |
| Benzoyl peroxide | 13.0 g |
| Toluene | 427.7 g |

As a result, a copolymer was obtained as a brown solid at normal temperature.

TABLE 3

| Example No. | Cement Additive | Amount Added Based on Weight of Cement (weight %) |
|---|---|---|
| 1 | Copolymer(e) | 0.21 |
| 2 | Copolymer(f) | 0.23 |
| 3 | Copolymer(f)/Copolymer(g)*1 | 0.17/0.03 |
| 4 | Copolymer(f)/Copolymer(b)*2 | 0.18/0.02 |
| 5 | Copolymer(a)/Copolymer(g) | 0.10/0.10 |
| 6 | Copolymer(a)/Copolymer(g) | 0.05/0.20 |
| 7 | Copolymer(b)/Copolymer(g) | 0.17/0.05 |
| 8 | Copolymer(c)/Copolymer(g) | 0.12/0.12 |
| 9 | Copolymer(d)/Copolymer(g) | 0.14/0.08 |
| 10 | Copolymer(g)/PC(a)*3 | 0.10/0.14 |
| 11 | Copolymer(g)/PC(b)*4 | 0.15/0.35 |
| 12 | Copolymer(g)/PC(c)*5 | 0.12/0.13 |
| 13 | Copolymer(g)/PC(d)*6 | 0.03/0.22 |
| 14 | Copolymer(g)/PC(e)*7 | 0.04/0.25 |

*1Amount of cement in concrete composition in Table 1: 280 Kg/m³
Water reducing rate from plain concrete: 18%
*2Amount of cement in concrete composition in Table 1: 450 Kg/m³
Water reducing rate from plain concrete: 18%
*3PC(a): Sodium salt of polyacrylic acid type copolymer ("AQUALOCK FC-600S", a product of Nippon Shokubai Kagaku Kogyo Co., Ltd.)
*4PC(b): Sodium salt of hydrolyzed product of styrene-maleic anhydride copolymer ("SMA-1000", a product of Sartomer Company)
*5PC(c): Sodium salt of hydrolyzed product of isobutylene-maleic anhydride copolymer ("ISOBAN-600", a product of Kuraray Co., Ltd.)
*6PC(d): Polycarboxylic acid type high range AE reducing agent ("CHUPOL HP-8", a product of Takemoto Oil and Fats Co., Ltd.)
*7PC(e): Polycarboxylic acid type high range AE reducing agent ("RHEOBUILD SP-8N", a product of NMB Ltd.)

TABLE 4

| Comparative Example No. | Cement Additive | Amount Added Based on Weight of Cement (weight %) |
|---|---|---|
| 1 | Copolymer(a) | 0.17 |
| 2 | Copolymer(b) | 0.19 |
| 3 | Copolymer(c) | 0.18 |
| 4 | Copolymer(d) | 0.20 |
| 5 | Copolymer(a)/Copolymer(b) | 0.09/0.09 |
| 6 | Copolymer(g) | 0.32 |
| 7 | NSFC*1 | 0.72 |
| 8 | Copolymer(a)/PC(a) | 0.10/0.07 |
| 9 | Copolymer(c)/PC(a) | 0.10/0.08 |
| 10 | PC(a) | 0.18 |
| 11 | PC(b) | 0.45 |
| 12 | PC(c) | 0.20 |
| 13 | PC(d) | 0.23 |

TABLE 4-continued

| Comparative Example No. | Cement Additive | Amount Added Based on Weight of Cement (weight %) |
| --- | --- | --- |
| 14 | PC(e) | 0.20 |

*[1]NSFC: Naphthalene sulfonate formaldehyde condensate type high range AE water reducing agent ("RHEOBUILD SP-9N", a product of NMB Ltd.)

TABLE 5

| Example No. | Immediately After Mixing | | After 30 minutes | | After 60 minutes | | Delay of Setting Time*[1] (minutes) | Compressive Strength (Kg/cm$^2$) 28 days |
| --- | --- | --- | --- | --- | --- | --- | --- | --- |
|  | Slump (cm) | Air Content (volume %) | Slump (cm) | Air Content (volume %) | Slump (cm) | Air Content (volume %) |  |  |
| 1 | 18.5 | 4.3 | 19.0 | 4.4 | 18.1 | 4.2 | +45 | 466 |
| 2 | 18.2 | 4.7 | 19.2 | 4.8 | 18.8 | 4.3 | +35 | 480 |
| 3 | 18.2 | 4.4 | 18.8 | 4.2 | 18.2 | 4.1 | +30 | 435 |
| 4 | 18.5 | 4.8 | 19.3 | 4.6 | 18.5 | 4.4 | +45 | 452 |
| 5 | 18.2 | 4.2 | 18.5 | 4.4 | 18.0 | 4.0 | +70 | 472 |
| 6 | 18.0 | 4.5 | 19.3 | 4.2 | 19.0 | 4.2 | +40 | 485 |
| 7 | 18.5 | 4.6 | 19.2 | 4.8 | 18.3 | 4.2 | +60 | 488 |
| 8 | 18.2 | 4.4 | 18.8 | 4.4 | 18.2 | 4.1 | +65 | 468 |
| 9 | 18.8 | 4.8 | 19.3 | 4.6 | 18.5 | 4.4 | +70 | 475 |
| 10 | 18.2 | 4.2 | 18.0 | 3.9 | 18.0 | 4.0 | +65 | 455 |
| 11 | 18.6 | 4.5 | 18.1 | 4.4 | 17.8 | 4.2 | +90 | 462 |
| 12 | 18.3 | 4.3 | 18.7 | 4.4 | 18.2 | 4.6 | +85 | 455 |
| 13 | 18.5 | 4.5 | 18.6 | 4.6 | 18.5 | 4.7 | +50 | 488 |
| 14 | 18.0 | 4.5 | 19.0 | 4.5 | 19.0 | 4.4 | +35 | 471 |

*[1]Delay time of initial setting from plain concrete

TABLE 6

| Comparative Example No. | Immediately After Mixing | | After 30 minutes | | After 60 minutes | | Delay of Setting Time*[1] (minutes) | Compressive Strength (Kg/cm$^2$) 28 days |
| --- | --- | --- | --- | --- | --- | --- | --- | --- |
|  | Slump (cm) | Air Content (volume %) | Slump (cm) | Air Content (volume %) | Slump (cm) | Air Content (volume %) |  |  |
| 1 | 18.3 | 4.5 | 15.2 | 4.5 | 11.5 | 4.4 | +105 | 465 |
| 2 | 18.5 | 4.3 | 15.8 | 4.5 | 12.0 | 4.3 | +80 | 463 |
| 3 | 18.6 | 4.4 | 15.0 | 4.1 | 10.5 | 4.2 | +90 | 471 |
| 4 | 18.2 | 4.7 | 14.5 | 4.3 | 10.0 | 4.3 | +85 | 475 |
| 5 | 18.6 | 4.2 | 15.3 | 4.2 | 12.0 | 4.4 | +90 | 465 |
| 6 | 18.0 | 4.5 | >25 | 3.2 | >25 | 3.6 | +25 | 478 |
| 7 | 18.5 | 4.2 | 16.6 | 3.8 | 13.2 | 3.5 | +90 | 465 |
| 8 | 18.6 | 4.2 | 14.8 | 4.4 | 12.0 | 4.4 | +95 | 462 |
| 9 | 18.3 | 4.1 | 14.2 | 3.9 | 10.5 | 4.2 | +80 | 457 |
| 10 | 18.8 | 4.4 | 16.2 | 4.5 | 13.2 | 4.3 | +85 | 465 |
| 11 | 18.0 | 4.3 | 13.8 | 4.2 | 9.8 | 4.3 | +110 | 458 |
| 12 | 18.6 | 4.6 | 15.5 | 4.5 | 12.8 | 4.8 | +105 | 452 |
| 13 | 18.7 | 4.5 | 17.5 | 4.5 | 15.5 | 4.7 | +25 | 465 |
| 14 | 18.5 | 4.2 | 16.3 | 4.1 | 13.8 | 4.4 | +75 | 462 |

*[1]Delay time of initial setting from plain concrete

What is claimed is:

1. A cement additive which comprises at least one copolymer A of an alkenyl ether represented by the formula $$R^1O(AO)_nR^2 \qquad (I)$$

wherein $R^1$ represents a $C_{2-5}$ alkenyl group;

$R^2$ represents a $C_{1-4}$ alkyl group;

AO represents a $C_{2-18}$ oxyalkylene group in which O represents an oxygen atom and A represents an alkylene group; and n represents an average adduct mol number of said oxyalkylene group having a number of 60 to 95 and maleic anhydride at a mole ratio of said alkenyl ether (I) to said maleic anhydride of 30~70:70~30, said maleic anhydrides hydrolyzed product or a salt of the hydrolyzed product.

2. The cement additive of claim 1 further comprising 5 to 30% by weight, based on 100 parts by weight of copolymer A, its hydrolyzed product or a salt of the hydrolyzed product, of a copolymer B of an alkenyl ether represented by the formula:

$$R^1O(AO)_mR^2 \qquad (II)$$

wherein $R^1$ represents a $C_{2-5}$ alkenyl group;

$R^2$ represents a $C_{1-4}$ alkyl group;

AO represents a $C_{2-18}$ oxyalkylene group in which O represents an oxygen atom and A represents an alkylene group; and m represents an average adduct mole number of said oxyalkylene group having a number of from 1 to 40 and maleic anhydride at a mole ratio of said alkenyl ether (II) to said maleic anhydride of 30~70 to 70~30, its hydrolyzed product or a salt of the hydrolyzed product or a copolymer C of an alkenyl ether represented by the formula:

$$R^1O(AO)_pR^2 \qquad (III)$$

wherein $R^1$, AO and $R^2$ are the same as defined in formula (I); and p represents an average adduct mol number of the oxyalkylene group having a number of from 100 to 150, and maleic anhydride at a mole ratio of said alkenyl ether (III) to said maleic anhydride of 30~70 to 70~30, its hydrolyzed product or a salt of the hydrolyzed product at a weight ratio of said copolymer B to said copolymer C of 95~5 to 5~95.

3. A cement additive which comprises:
(1) at least one copolymer B of an alkenyl ether represented by the formula:

$$R^1O(AO)_mR^2 \qquad (II)$$

wherein
$R^1$ represents a $C_{2-5}$ alkenyl group;
$R^2$ represents a $C_{1-4}$ alkyl group;
AO represents a $C_{2-18}$ oxyalkylene group in which O represents an oxygen atom and A represents an alkylene group; and
m represents an average adduct mole number of said oxyalkylene group having a number of from 1 to 40 and maleic anhydride at a mole ratio of said alkenyl ether (II) to said maleic anhydride of 30~70 to 70~30, its said maleic anhydrides hydrolyzed product or a salt of the hydrolyzed product and (2) at least one copolymer C of an alkenyl ether represented by the formula:

$$R^1O(AO)_pR^2 \qquad (III)$$

wherein
$R^1$, AO and $R^2$ are the same as defined in formula (II); and
p represents an average adduct mol number of the oxyalkylene group having a number of from 100 to 150, and maleic anhydride at a mole ratio of said alkenyl ether (III) to said maleic anhydride of 30~70 to 70~30, its hydrolyzed product or a salt of the hydrolyzed product at a weight ratio of said copolymer B to said copolymer C of 95~5 to 5~95.

4. A cement additive composition which comprises:
(A) at least one copolymer C of an alkenyl ether represented by the formula $$R^1O(AO)_pR^2 \qquad (III)$$

wherein
$R^1$ represents a $C_{2-5}$ alkenyl group;
$R^2$ represents a $C_{1-4}$ alkyl group;
AO represents a $C_{2-18}$ oxyalkylene group in which O represents an oxygen atom and A represents an alkylene group, or a mixture thereof; and
p represents an average adduct mol number of said oxyalkylene group having a number of from 100 to 150 and maleic anhydride at a mol ratio of said alkenyl ether (III) to said maleic anhydride of 30~70 to 70~30, its hydrolyzed product or a salt of the hydrolyzed product and (B) at least one cement additive of a water soluble polymer which contains carboxyl group (Polymer D) at a weight ratio of said copolymer C to said Polymer D of 5~95 to 95~5.

5. The cement additive of claim 1, 2, 3 or 4, wherein the mole ratio of alkenyl ether to maleic anhydride is about 1:1.

6. The cement additive of any one of claim 1, 2, 3 or 4, wherein $R^1$ is an allyl group.

7. The cement additive of any one of claim 1, 2, 3 or 4, wherein $R^2$ is selected from a methyl or butyl group.

8. The cement additive of any one of claim 1, 2, 3 or 4, wherein AO is a $C_{2-4}$ oxyalkylene group.

9. The cement additive of claim 8, wherein said oxyalkylene group is selected from an oxyethylene or oxypropylene group.

10. The cement additive of claim 8, wherein said $C_{2-4}$ oxyalkylene group is a mixture of an oxyethylene group and an oxypropylene group.

11. The cement additive of claim 1, 2, 3 or 4 further comprising at least one cement additive selected from the group consisting of air entrainers, water proofing agents, strength enhancers, antifoaming agents and curing accelerators.

12. An improved hydraulic cement composition comprising a hydraulic cement and a cement additive of claim 1, 2, 3 or 4.

13. The improved hydraulic cement composition of claim 12 wherein said cement composition is a concrete comprising a mixture of portland cement, fine aggregate, coarse aggregate, water, and from 0.05 to 2 parts by weight of cement additive per 100 parts of portland cement.

14. The improved hydraulic cement composition of claim 12 which further contains at least one additive selected from the group consisting of air entrainers, water proofing agents, strength enhancers, antifoaming agents, or curing accelerators.

* * * * *